(12) United States Patent
Roemersperger et al.

(10) Patent No.: US 9,429,441 B2
(45) Date of Patent: Aug. 30, 2016

(54) ARRANGEMENT FOR WARNING OF AND/OR FOR CONSIDERATION OF UTILITY-VEHICLE-RELEVANT DRIVING RESTRICTIONS

(71) Applicant: MAN Truck & Bus AG, Munich (DE)

(72) Inventors: Xaver Roemersperger, Munich (DE); Karlheinz Doerner, Karlsfeld (DE); Walter Schwertberger, Althegnenberg (DE); Sebastian Voell, Dachau (DE); Sven Kraus, Garching (DE); Johannes Echtler, Munich (DE)

(73) Assignee: MAN TRUCK & BUS AG, Munich (DE)

( * ) Notice: Subject to any disclaimer, the term of this patent is extended or adjusted under 35 U.S.C. 154(b) by 33 days.

(21) Appl. No.: 14/244,258

(22) Filed: Apr. 3, 2014

(65) Prior Publication Data

US 2014/0303886 A1 Oct. 9, 2014

(30) Foreign Application Priority Data

Apr. 4, 2013 (DE) ........................ 10 2013 005 828

(51) Int. Cl.
| | |
|---|---|
| *G01C 21/34* | (2006.01) |
| *G08G 1/0967* | (2006.01) |
| *G08G 1/0968* | (2006.01) |
| *G01C 21/36* | (2006.01) |

(52) U.S. Cl.
CPC ....... *G01C 21/3415* (2013.01); *G01C 21/3461* (2013.01); *G01C 21/3697* (2013.01); *G08G 1/09675* (2013.01); *G08G 1/096716* (2013.01);
(Continued)

(58) Field of Classification Search
CPC .......... G01C 21/3461; G01C 21/3492; G08G 1/096716; G08G 1/207; G08G 1/087; G08G 1/096872; G07C 5/085; G08C 21/3484; G08C 21/3461; G08C 1/096811; G08C 1/087
USPC .............. 701/33.4, 411, 431, 532, 417, 461; 340/425.5, 907, 901
See application file for complete search history.

(56) References Cited

U.S. PATENT DOCUMENTS

| | | | |
|---|---|---|---|
| 6,216,088 B1 * | 4/2001 | Schulz ............. | G08G 1/096811 701/117 |
| 6,700,504 B1 * | 3/2004 | Aslandogan ........... | G08G 1/087 340/901 |
| 6,898,519 B1 | 5/2005 | Schilling | |

(Continued)

FOREIGN PATENT DOCUMENTS

| | | |
|---|---|---|
| DE | 19944938 A1 | 3/2001 |
| DE | 1005387373 A1 | 5/2002 |

(Continued)

*Primary Examiner* — Yuri Kan
(74) *Attorney, Agent, or Firm* — Lucas & Mercanti, LLP

(57) ABSTRACT

A device for installation in a utility vehicle for warning or consideration of a utility-vehicle-relevant driving restriction. The device includes a receiving unit for receiving at least one item of utility-vehicle-relevant information, which is transmitted from an apparatus arranged on a traffic infrastructure or at least adjacent thereto and which relates to the traffic infrastructure, and a provision unit for providing the item of utility-vehicle-relevant information or an item of information based thereon to the driver of the utility vehicle. The apparatus for placement on or at least adjacent to a traffic infrastructure comprises a functional unit for storing or processing at least one item of utility-vehicle-relevant information relating to the traffic infrastructure and a transmitting unit for transmitting the item of utility-vehicle-relevant information to one or more utility vehicles.

13 Claims, 2 Drawing Sheets

(52) U.S. Cl.
CPC ... *G08G 1/096775* (2013.01); *G08G 1/096811* (2013.01); *G08G 1/096827* (2013.01)

(56) References Cited

U.S. PATENT DOCUMENTS

| | | | | |
|---|---|---|---|---|
| 7,414,542 | B2* | 8/2008 | McMahon | G08G 1/087 340/907 |
| 2004/0024523 | A1* | 2/2004 | Uotani | G01C 21/3492 701/411 |
| 2005/0256638 | A1* | 11/2005 | Takahashi | G01C 21/3484 701/431 |
| 2007/0050108 | A1* | 3/2007 | Larschan | G07C 5/085 701/33.4 |
| 2007/0138347 | A1 | 6/2007 | Ehlers | |
| 2007/0143011 | A1* | 6/2007 | Sato | G01C 21/3461 701/417 |
| 2009/0045927 | A1* | 2/2009 | Atella | G08G 1/207 340/425.5 |
| 2010/0036599 | A1* | 2/2010 | Froeberg | G01C 21/3461 701/532 |

FOREIGN PATENT DOCUMENTS

| | | |
|---|---|---|
| DE | 102012024621 A1 | 6/2014 |
| EP | 1832843 A1 | 9/2007 |

* cited by examiner

ARRANGEMENT FOR WARNING OF AND/OR FOR CONSIDERATION OF UTILITY-VEHICLE-RELEVANT DRIVING RESTRICTIONS

BACKGROUND OF THE INVENTION

The invention relates to a device for installation in a utility vehicle and preferably for warning of and/or for consideration of a utility-vehicle-relevant driving restriction. The invention additionally comprises an apparatus for placement on or at least adjacent to a traffic infrastructure and preferably for warning of and/or communication of a utility-vehicle-relevant driving restriction. The invention additionally comprises associated operating methods and a system having a device and an apparatus as mentioned above.

Drivers of utility vehicles must also give special attention to the route selection in road traffic, in addition to the actual driving task. Heavy utility vehicles, for example, have a permissible total height of up to 4 m and a permissible total mass of up to 40 tons or 44 tons in combined traffic. Many traffic infrastructures, in particular bridges or tunnels, typically have weight and/or height limits, which are less than the mentioned values. If the driver overlooks warning or instruction signs or such signs are simply not provided, he will drive unobstructed up to the obstruction and cannot pass it. A time-consuming and hazardous maneuvering procedure becomes necessary. Various navigation systems having a utility-vehicle-specific database currently do exist on the market, which incorporate the utility-vehicle-relevant traffic infrastructures. However, the database is typically not complete or up to date, so that it still happens that drivers of utility vehicles are confronted with unavoidable driving restrictions in spite of such navigation systems.

BRIEF SUMMARY OF THE INVENTION

One object of the present invention is to provide a device, the use of which reliably prevents the driver of utility vehicles from being confronted with unavoidable driving restrictions.

The invention provides a device for installation in a utility vehicle (for example, an omnibus or a truck), and preferably for warning of and/or for consideration of a driving restriction at least potentially produced by a traffic infrastructure (for example, a driving prohibition, a driving obstruction, a driving restriction, etc.). The device comprises a receiver unit for wireless receiving in particular of a utility-vehicle-relevant item of information, which at least indirectly relates to the traffic infrastructure, and which has preferably been sent from an apparatus arranged on the traffic infrastructure (for example, a bridge, a road, a tunnel, a construction site route, etc.) or at least adjacent thereto. Furthermore, the device comprises a provision unit (for example, a display and/or speech output unit) for providing the item of utility-vehicle-relevant information and/or an item of information based thereon to the driver of the utility vehicle.

It is possible that the device comprises an ascertainment unit (for example, computer unit, processor, control unit, etc.), which ascertains, as a function of the received item of utility-vehicle-relevant information and at least one item of utility-vehicle-specific information, an at least potential driving restriction for the utility vehicle. Alternatively or additionally, the ascertainment unit can ascertain a driving recommendation for the utility vehicle, expediently if passing the traffic infrastructure is not possible for the utility vehicle (for example, is forbidden) and/or a driving restriction for the utility vehicle has actually been ascertained previously by means of the ascertainment unit. The driving recommendation includes in particular a route suggestion for bypassing the traffic infrastructure.

The device can furthermore have a storage apparatus, in which the at least one item of utility-vehicle-specific information is stored.

The item of utility-vehicle-specific information can comprise, for example, the permissible utility vehicle total weight, the actual utility vehicle total weight, the utility vehicle height, the utility vehicle width, and/or the type of the transported load.

In an embodiment of the present invention a predicted travel route is incorporated in the ascertainment of the driving recommendation and/or the at least potential driving restriction, to be able to ensure the option of bypassing the driving restriction in a timely manner. For this purpose, the device can cooperate with a navigation system or a vehicle control unit, for example, wherein the predicted travel route can originate from the navigation system or the vehicle control unit. Alternatively or additionally, the predicted travel route can comprise at least one direct driver action detected by means of one or more detection units. The direct driver action can comprise, for example, setting a utility vehicle turn signal apparatus, movement of a utility vehicle steering wheel, and/or actuating a utility vehicle brake.

The item of utility-vehicle-relevant information can additionally comprise an at least potential driving restriction, for example, the type, the position, and/or the spatial extension (for example, road name, etc.) of the driving restriction. The at least potential driving restriction can comprise at least one of the following: maximum permissible clearance height of a tunnel, maximum permissible clearance height under a bridge, maximum permissible vehicle width on a road, maximum permissible vehicle width on a construction site route, maximum permissible (vehicle) mass on a route section, a passage restriction for hazardous material transports, a passage restriction for transit traffic, a time-specific driving prohibition (for example, holidays, holiday travel time, etc.), an exhaust-gas-specific passage restriction, a cul-de-sac without utility vehicle turning possibility, etc. The item of utility-vehicle-relevant information can also comprise, of course, the actual roadway width, the actual clearance height, etc., for example, so that the driver of the utility vehicle can decide himself whether or not passing the traffic infrastructure is possible or permitted.

The item of utility-vehicle-relevant information can furthermore comprise a specific route suggestion for bypassing the traffic infrastructure, which can expediently be processed in the navigation system or the vehicle control unit of the utility vehicle. As an alternative, the item of utility-vehicle-relevant information is configured per se such that it is incorporated in the route planning of the utility vehicle navigation system or the vehicle control unit for bypassing the traffic infrastructure.

According to a further embodiment, the item of utility-vehicle-relevant information additionally informs about which utility vehicle configuration (for example, utility vehicles having permissible total height of up to 4 m, utility vehicles having a permissible total mass of up to 40 tons or 44 tons, etc.) the item of utility-vehicle-relevant information is decisive for and/or for which it is not, for example, for which utility vehicle configuration the at least potential driving restriction and/or the route suggestion for bypassing the traffic infrastructure is relevant.

The invention additionally relates to an operating method for a device, which is expediently as described herein, for installation in a utility vehicle and preferably for warning of and/or for consideration of a driving restriction at least potentially produced by a traffic infrastructure. The operating method comprises the steps of the wireless reception in particular by means of a receiving unit of at least one item of utility-vehicle-relevant information, which at least indirectly relates to the traffic infrastructure, and which has preferably been transmitted from an apparatus arranged on the traffic infrastructure or at least adjacent thereto, and the provision by means of a provision unit of the item of utility-vehicle-relevant information and/or an item of information based thereon to the driver of the utility vehicle. Further steps according to the invention of the operating method result from the description of the device according to the invention.

The invention additionally relates to an apparatus for placement on or at least adjacent to a traffic infrastructure and, for example, for warning of and/or for communication of a driving restriction at least potentially produced by a traffic infrastructure. The apparatus comprises a functional unit (for example, an ascertainment unit, in particular a computer unit and/or a storage unit) for storing and/or processing at least one item of utility-vehicle-relevant information, which at least indirectly relates to the traffic infrastructure, and a transmitting unit for wireless transmission in particular of the item of utility-vehicle-relevant information to one or more utility vehicles. In the scope of the invention, the storage unit preferably also comprises, for example, a buffer memory for buffering an item of utility-vehicle-relevant information which at least indirectly relates to the traffic infrastructure, Further features according to the invention of the apparatus result from the corresponding description of the device according to the invention.

The apparatus can have, for example, a receiving unit for the wireless reception in particular of a control command (for example, a command for activating or deactivating the transmitting unit), an item of utility-vehicle-relevant information relating to the traffic infrastructure and/or an update of an item of utility-vehicle-relevant information relating to the traffic infrastructure. The apparatus can therefore represent a quasi-bidirectional communication unit. The receiving unit allows the apparatus to be universally usable without problems for various traffic infrastructures and/or to be able to be updated easily.

The invention additionally relates to an operating method for an apparatus, which is expediently as described herein, for placement on or at least adjacent to a traffic infrastructure and preferably for warning of and/or for communication of a driving restriction at least potentially produced by traffic infrastructure, having the step of transmitting by means of a transmitting unit an item of utility-vehicle-relevant information, which at least indirectly relates to the traffic infrastructure, to one or more utility vehicles. Further steps according to the invention of the operating method result from the description of the apparatus according to the invention.

Furthermore, the invention relates to a system having a device and an apparatus as described herein. In addition, the invention also comprises a utility vehicle, preferably a truck or an omnibus, having a device as described herein.

It is also to be noted that preferably the above-mentioned at least one item of utility-vehicle-relevant information relates at least indirectly to the traffic infrastructure.

The above-described embodiments of the invention are combinable with one another arbitrarily. Other advantageous refinements of the invention are disclosed in the dependent claims or result from the following description of preferred embodiments of the invention in conjunction with the appended figures.

DETAILED DESCRIPTION OF THE INVENTION

Figure 1:
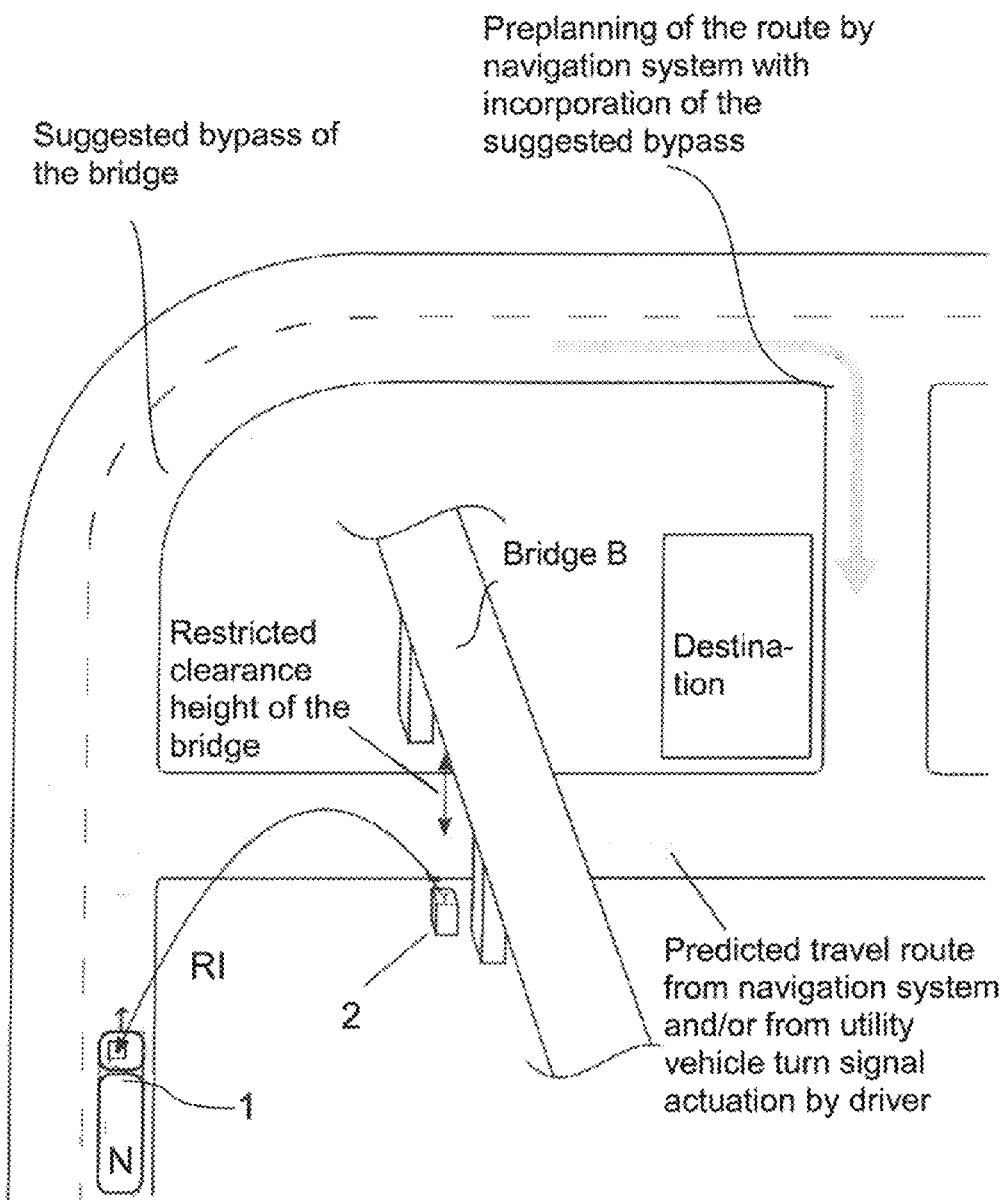
FIG. 1 shows an example scenario having a system, which comprises a device and an apparatus, according to one embodiment of the invention

FIG. 1 shows a utility vehicle N, a traffic infrastructure B in the form of a bridge having a maximum permissible clearance height, and a utility vehicle destination. The utility vehicle N is equipped with a navigation system, into which the driver has input the utility vehicle destination. The suggested travel route calculated by the navigation system leads through below the bridge B. The utility vehicle N comprises a height which is greater than the maximum permissible clearance height of the bridge B, however. The hazard therefore exists that the driver of the utility vehicle N will follow the proposed travel route, for example, because a possibly provided notification sign has been overlooked, and will establish immediately before the bridge B that a passage below the bridge B is not possible, because of which a time-consuming and hazardous maneuvering procedure would become necessary. To avoid this hazard, the utility vehicle N has a device 1, while an apparatus 2 is placed on or at least adjacent to the bridge B.

The apparatus 2 comprises a functional unit (for example, a computer unit having (buffer) memory), which is used for the purpose of at least buffering and processing an item of utility-vehicle-relevant information RI, which relates to the bridge B, and a transmitting unit for the wireless transmission of the item of utility-vehicle-relevant information RI to utility vehicles in receiving range. In the example scenario shown in FIG. 1, the item of utility-vehicle-relevant information RI comprises the above-mentioned maximum permissible clearance height of the bridge B. As a function of the traffic infrastructure, for example, tunnels, bridges, construction site routes, zones inside cities or towns, pedestrian zones, nature protection areas, etc., the item of utility-vehicle-relevant information RI can also comprise, for example, a maximum permissible vehicle width, a passage restriction, for example, for hazardous material transports or transit traffic, a time-specific driving prohibition, an exhaust-gas-specific passage restriction, a cul-de-sac without utility vehicle turning possibility, etc.

The device 1 comprises a receiving unit for the wireless reception of the item of utility-vehicle-relevant information RI, which was transmitted from the apparatus 2, and a provision unit for providing the item of utility-vehicle-relevant information RI or at least one item of information based thereon to the driver of the utility vehicle N. The provision unit can be a display unit, for example, a display screen of the navigation system provided in any case, or a loudspeaker of the utility vehicle N.

The device 1 is equipped with a storage apparatus, in which items of utility-vehicle-specific information are stored, for example, the permissible or actual utility vehicle total weight, the utility vehicle height, the utility vehicle width, the type of the transported load, etc.

The device 1 comprises an ascertainment unit (for example, computer unit, control unit, etc.), which can now ascertain, in a targeted manner as a function of the item of utility-vehicle-specific information, the received item of utility-vehicle-relevant information RI, and the predicted travel route of the utility vehicle N, whether a driving restriction (for example, a prohibition, a driving restriction, etc.) potentially exists or is upcoming for the utility vehicle N. If so, as in the example scenario shown in FIG. 1, a driving recommendation for bypassing the bridge B can be ascertained at the same time and communicated via the provision unit to the driver of the utility vehicle N. By way of the consideration of the predicted travel route, the possibility for bypassing the driving restriction can be ensured early and above all in a timely manner. The predicted travel route originates from the navigation system of the utility vehicle N or a vehicle control unit. It can alternatively or additionally comprise direct driver actions, which can be detected by means of one or more detection units, for example, sensors. The direct driver actions comprise in particular setting the utility vehicle turn signal apparatus for the travel direction change indication, a utility vehicle steering wheel movement, and/or a brake actuation.

The device 1 cooperates with the navigation system or an additional output unit such that the display screen of the navigation system or the display screen of an additional output unit and the conventional loudspeaker of the utility vehicle N can be used to provide the item of utility-vehicle-relevant information RI and the item of information based thereon to the driver of the utility vehicle N.

In a somewhat simpler embodiment of the invention, the item of utility-vehicle-relevant information RI can also only comprise a mere warning, which informs of the potential driving restriction in the form of the maximum permissible clearance height of the bridge B, without a travel route recalculation necessarily having to occur.

The item of utility-vehicle-relevant information RI can further comprise a quasi-prefinished route suggestion for bypassing the bridge B, which can expediently modify the predicted travel route of the navigation system or the vehicle control unit.

Figure 2:
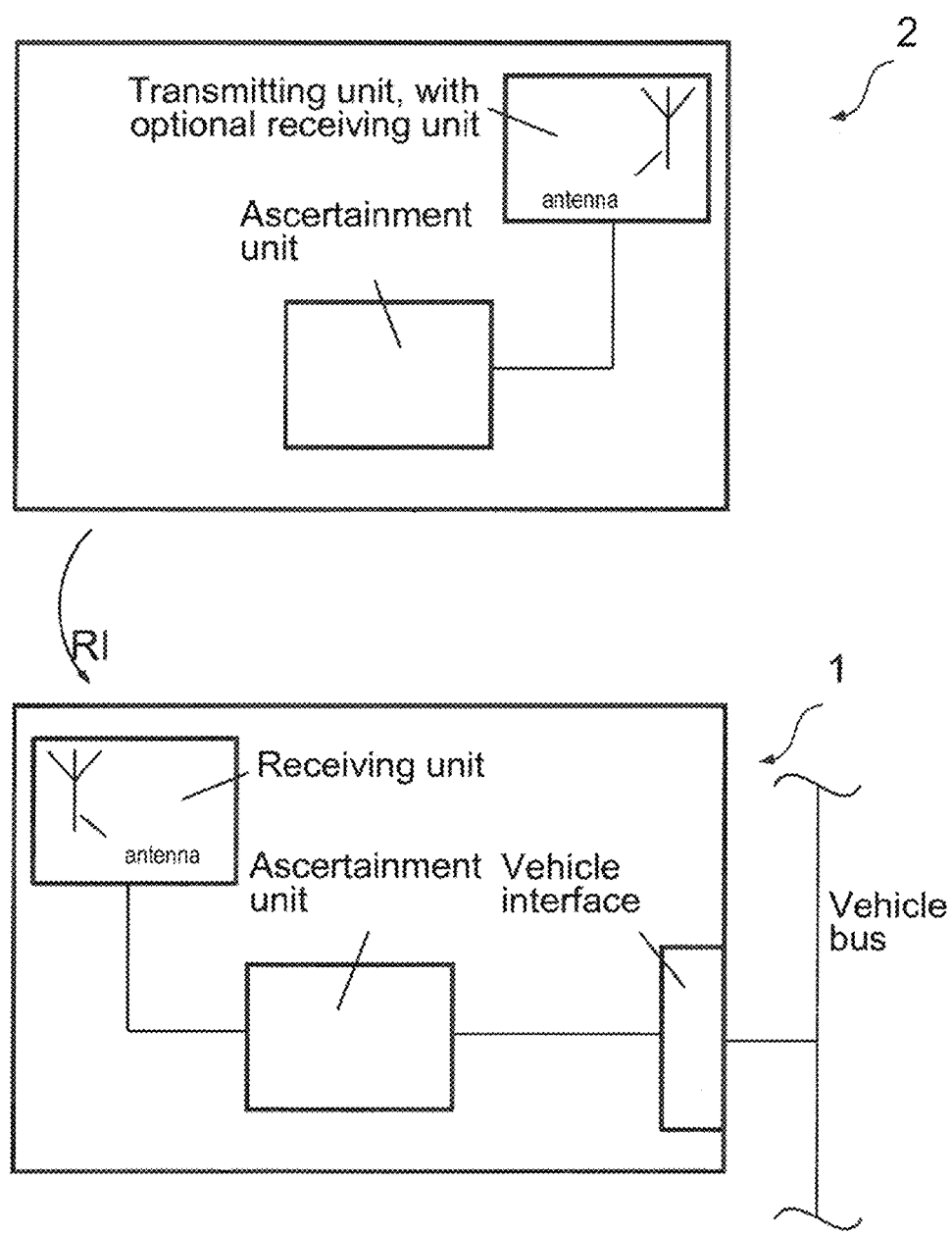
FIG. 2 shows a schematic view of a device and an apparatus according to one embodiment of the invention.

FIG. 2 schematically shows the device 1, in particular the receiving unit, which can receive the item of utility-vehicle-relevant information RI by means of at least one antenna, and the ascertainment unit (for example, computer unit, processor, control unit, etc.). The received data are relayed to the ascertainment unit. The ascertainment unit processes the data and prepares them such that they can be turned over via an interface to a vehicle data bus and transferred to the provision unit.

FIG. 2 schematically shows the apparatus 2, in particular the transmitting unit, an optional receiving unit having at least one antenna, and the functional unit. The data to be transmitted can be transferred in principle via multiple pathways to the apparatus 2. This can occur, for example, in the form of a one-time flash process or also expediently continuously from a control centre, for example. In this manner, a new bypass of an obstruction can be suggested quickly, for example, if the original bypass is blocked by congestion, for example. The data can be stored or at least buffered, processed, and relayed to the transmitting unit in the functional unit. The data are continuously transmitted therefrom at a defined frequency to the nearby utility vehicles.

The invention is not restricted to the above-described preferred embodiments. Rather, a variety of variants and alterations are possible, which also make use of the idea of the invention and therefore fall in the scope of protection. In addition, the invention also claims protection for the subject matter and the features of the dependent claims independently of the features and claims referred to.

The invention claimed is:

1. A device for installation in a utility vehicle for one of warning of and consideration of a driving restriction at least potentially produced by a traffic infrastructure, the device having:
   a receiver receiving at least one item of utility-vehicle-relevant information relating to the traffic infrastructure;
   a provision unit for providing one of the at least one item of utility-vehicle-relevant information and at least one item of information based thereon to the driver of the utility vehicle, and
   an ascertaining unit configured to ascertain, as a function of the one of received item of utility-vehicle-relevant information and at least one item of utility-vehicle-specific information and as a function of a predicted travel route for the utility vehicle, whether the traffic infrastructure produces a driving restriction that exists or is imminent for the utility vehicle, and a driving recommendation for the utility vehicle, the ascertaining unit being one of a computer, processor, and controller,
   wherein the predicted travel route includes at least one direct driver action detected by at least one sensor, the at least one driver action comprising at least one of setting a utility vehicle turn signal apparatus, a rotational movement of a utility vehicle steering wheel, and actuating a utility vehicle brake.

2. The device according to claim 1, wherein the ascertainment unit is further configured to ascertain a driving recommendation for the utility vehicle if passing the traffic infrastructure is not possible for the utility vehicle or a driving restriction for the utility vehicle is actually ascertained.

3. The device according to claim 1, further comprising a storage apparatus in which the at least one item of utility-vehicle-specific information is stored.

4. The device according to claim 1, wherein the at least one item of utility-vehicle-specific information comprises the permissible utility vehicle total weight, the actual utility vehicle total weight, the utility vehicle height, the utility vehicle width, and/or the type of the transported load.

5. The device according to claim 1, the predicted travel route originates from a navigation system.

6. The device according to claim 1, wherein the at least one tern of utility-vehicle-relevant information comprises a route suggestion for bypassing the traffic infrastructure.

7. The device according to claim 1, further comprising a navigation system configured to consider the at least one item of utility-vehicle-relevant information in its route planning for bypassing the traffic infrastructure.

8. The device according to claim 1, wherein the at least one item of utility-vehicle-relevant information comprises at least one of a category of a potential driving restriction for the utility vehicle and a position of the driving restriction.

9. The device according to claim 8, wherein the potential driving restriction comprises at least one of the following categories:
   a maximum permissible clearance height of a tunnel or a bridge,
   a maximum permissible vehicle width on a road or construction site route,
   a passage restriction for hazardous material transports or transit traffic, a time-specific driving prohibition, an exhaust-gas-specific passage restriction, a cul-de-sac without utility vehicle turning possibility, and a maximum permissible total mass and/or an actual vehicle mass on a route section.

10. The device according to claim 1, wherein the at least one item of utility-vehicle-relevant information additionally informs about which utility vehicle configuration for which it applies.

11. An operating method for a device installed in a utility vehicle for warning of or for consideration of a driving restriction at least potentially produced by a traffic infrastructure, having the following steps:

receiving, by a receiver of the device, at least one item of utility-vehicle-relevant information relating to the traffic infrastructure, providing, by a provision unit of the device, the at least one item of utility-vehicle-relevant information or at least one item of information based thereon to the driver of the utility vehicle, and ascertaining, by an ascertainment unit, as a function of the one of received item of utility-vehicle-relevant information and at least one item of utility-vehicle-specific information and as a function of a predicted travel route for the utility vehicle, whether the traffic infrastructure produces a driving restriction that exists or is imminent for the utility vehicle, and a driving recommendation for the utility vehicle, the ascertaining unit being one of a computer, processor, and controller, wherein the predicted travel route includes at least one direct driver action detected by at least one sensor, the at least one driver action comprising at least one of setting a utility vehicle turn signal apparatus, a rotational movement of a utility vehicle steering wheel, and actuating a utility vehicle brake.

12. A system, comprising:

a device for installation in a utility vehicle for one of warning of and/or for consideration of a driving restriction at least potentially produced by a traffic infrastructure, the device having:

a receiver receiving at least one item of utility-vehicle-relevant information relating to the traffic infrastructure;

a provision unit for providing one of the at least one item of utility-vehicle-relevant information and at least one item of information based thereon to the driver of the utility vehicle; and an ascertainment unit configured to ascertain, as a function of the one of received item of utility-vehicle-relevant information and at least one item of utility-vehicle-specific information, and as a function of a predicted travel route for the utility vehicle, whether the traffic infrastructure produces a driving restriction that exists or is imminent for the utility vehicle, and a driving recommendation for the utility vehicle, the ascertaining unit being one of a computer, processor and controller, wherein the predicted travel route includes at least one direct driver action detected by at least one sensor, the at least one driver action comprising at least one of setting a utility vehicle turn signal apparatus, a rotational movement of a utility vehicle steering wheel, and actuating a utility vehicle brake, and an apparatus for placement at or adjacent to the traffic infrastructure for warning of or for communication of a driving restriction at least potentially produced by the traffic infrastructure, the apparatus having:

a memory for storing the at least one item of utility-vehicle-relevant information relating to the traffic infrastructure, and a transmitter transmitting the at least one item of utility-vehicle-relevant information to the device.

13. A utility vehicle having a device for installation in a utility vehicle for one of warning of and/or for consideration of a driving restriction at least potentially produced by a traffic infrastructure, the device having:

a receiver receiving at least one item of utility-vehicle-relevant information relating to the traffic infrastructure;

a provision unit for providing one of the at least one item of utility-vehicle-relevant information and at least one item of information based thereon to the driver of the utility vehicle; and an ascertainment unit configured to ascertain, as a function of the one of received item of utility-vehicle-relevant information and at least one item of utility-vehicle-specific information, and as a function of a predicted travel route for the utility vehicle, whether the traffic infrastructure produces a driving restriction that exists or is imminent for the utility vehicle, and a driving recommendation for the utility vehicle, the ascertaining unit being one of a computer processor, and controller, wherein the predicted travel route includes at least one direct driver action detected by at least one sensor, the at least one driver action comprising at least one of setting a utility vehicle turn signal apparatus, a rotational movement of a utility vehicle steering wheel, and actuating a utility vehicle brake.

* * * * *